United States Patent
Yeh et al.

(10) Patent No.: US 9,230,391 B2
(45) Date of Patent: Jan. 5, 2016

(54) PRODUCT DELIVERY DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Chin-Wen Yeh, New Taipei (TW); Yang Xiao, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

(*) Notice: Subject to any disclaimer, the term of this patent is extended or adjusted under 35 U.S.C. 154(b) by 86 days.

(21) Appl. No.: 14/058,982

(22) Filed: Oct. 21, 2013

(65) Prior Publication Data

US 2014/0291347 A1  Oct. 2, 2014

(30) Foreign Application Priority Data

Mar. 26, 2013 (CN) .......................... 2013 1 00987396

(51) Int. Cl.
| G07F 11/38 | (2006.01) |
| G07F 11/10 | (2006.01) |
| G07F 11/32 | (2006.01) |
| B65G 35/04 | (2006.01) |
| G07F 11/00 | (2006.01) |

(52) U.S. Cl.
CPC .............. G07F 11/005 (2013.01); *B65G 35/04* (2013.01); *G07F 11/10* (2013.01); *G07F 11/32* (2013.01); *G07F 11/38* (2013.01)

(58) Field of Classification Search
CPC ......... G07F 11/38; G07F 11/10; G07F 11/32; G07F 11/005; B65G 35/04
USPC ......... 221/197, 251, 306, 154, 130, 195, 232, 221/269, 125, 129, 198, 131, 207
See application file for complete search history.

(56) References Cited

U.S. PATENT DOCUMENTS

| 2,784,872 A * | 3/1957 | Lux .......................... G07F 11/38 194/282 |
| 3,452,899 A * | 7/1969 | Libberton ................ A47F 1/126 221/242 |
| 3,722,745 A * | 3/1973 | Gushi ..................... G07F 11/38 221/130 |
| 4,023,704 A * | 5/1977 | Pitel .......................... G07F 5/18 221/129 |
| 4,061,245 A * | 12/1977 | Lotspeich ................ G07F 11/60 221/75 |
| 4,134,520 A * | 1/1979 | Collins .................... G07F 11/38 221/129 |
| 4,289,254 A * | 9/1981 | Spring .......................... 221/295 |
| 4,336,892 A * | 6/1982 | Cox ........................ G07F 11/42 221/125 |
| 4,405,059 A * | 9/1983 | Kull ........................ B65G 1/08 221/129 |
| 4,757,915 A * | 7/1988 | Albright ................. G07F 11/42 221/242 |
| 4,962,867 A * | 10/1990 | Ficken .................... G07F 11/14 221/130 |
| 5,263,596 A * | 11/1993 | Williams ............ G07F 17/0092 221/153 |
| 6,684,126 B2 * | 1/2004 | Omura .................... G07F 11/04 221/2 |

(Continued)

*Primary Examiner* — Rakesh Kumar
(74) *Attorney, Agent, or Firm* — Novak Druce Connolly Bove + Quigg LLP

(57) ABSTRACT

A product delivery device includes a receiving tray. The receiving tray includes a bottom plate, a pushing plate, and a shielding plate. The pushing plate is toward the shielding plate, and the shielding plate is rotatably attached to the bottom plate. A product exit is defined in the bottom plate and is covered by the shielding plate. The pushing plate pushes a product onto the shielding plate. The shielding plate rotates to allow the product to drop out of the receiving tray via the product exit.

14 Claims, 5 Drawing Sheets

(56) References Cited

U.S. PATENT DOCUMENTS

| | | | |
|---|---|---|---|
| 6,862,896 B1 * | 3/2005 | Seidl | F25D 3/08 220/592.16 |
| 7,404,494 B2 * | 7/2008 | Hardy | A47F 1/125 211/1.57 |
| 7,418,311 B1 * | 8/2008 | Lagassey | G07F 9/026 221/150 R |
| 8,083,078 B2 * | 12/2011 | Omura | B65G 1/06 211/51 |
| 2009/0014461 A1 * | 1/2009 | Omura | B65G 1/08 221/156 |
| 2015/0001247 A1 * | 1/2015 | Yeh | G07F 11/38 221/306 |

* cited by examiner

PRODUCT DELIVERY DEVICE

BACKGROUND

1. Technical Field

The present disclosure relates to product delivery devices, and particularly to a product delivery device in an automatic vending machine.

2. Description of Related Art

Vending machines allow customers to buy products twenty-four hours a day. When the customer purchases a product, a helical element in a cabinet is rotated to push the product out of the cabinet. However, sometimes the product drops out of the cabinet when the cabinet is shaken, and sometimes the product gets stuck in the helical element. Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
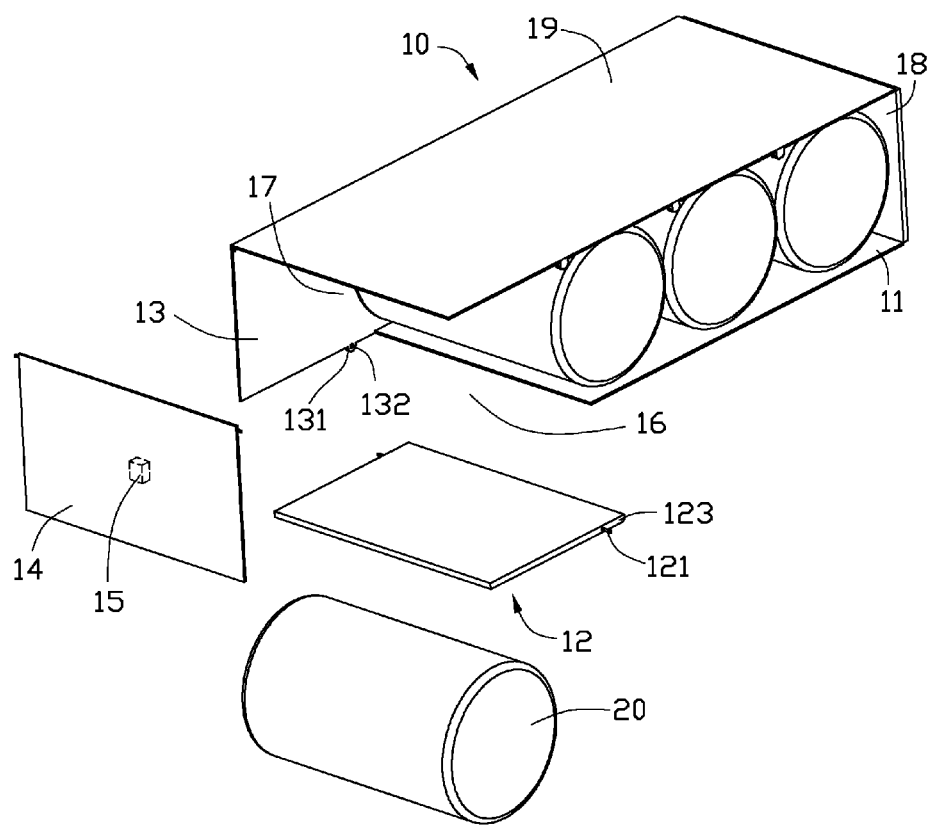
FIG. 1 is an exploded, isometric view of a product delivery device in accordance with an embodiment.
Figure 2:
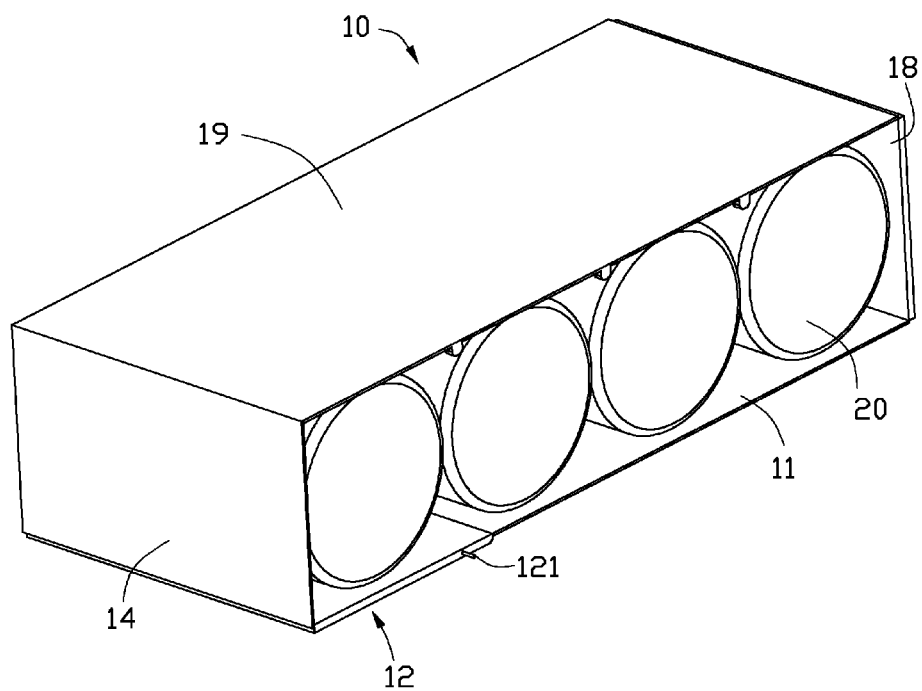
FIG. 2 is an assembled view of the product delivery device of FIG. 1.
Figure 3:
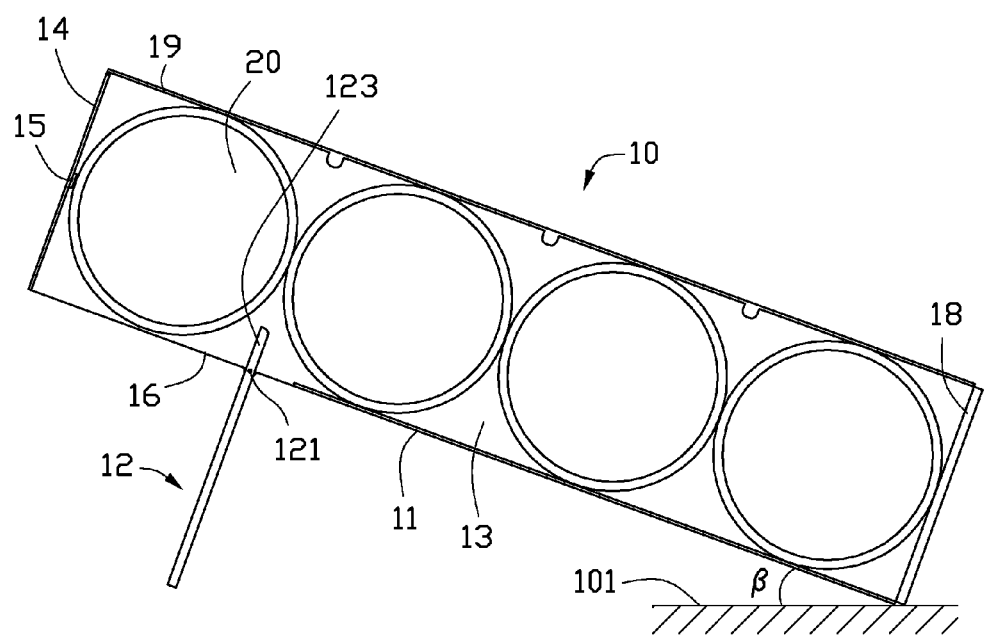
FIG. 3 is a side view of the product delivery device of FIG. 2, a shielding plate is open, and a securing plate is closed.
Figure 4:
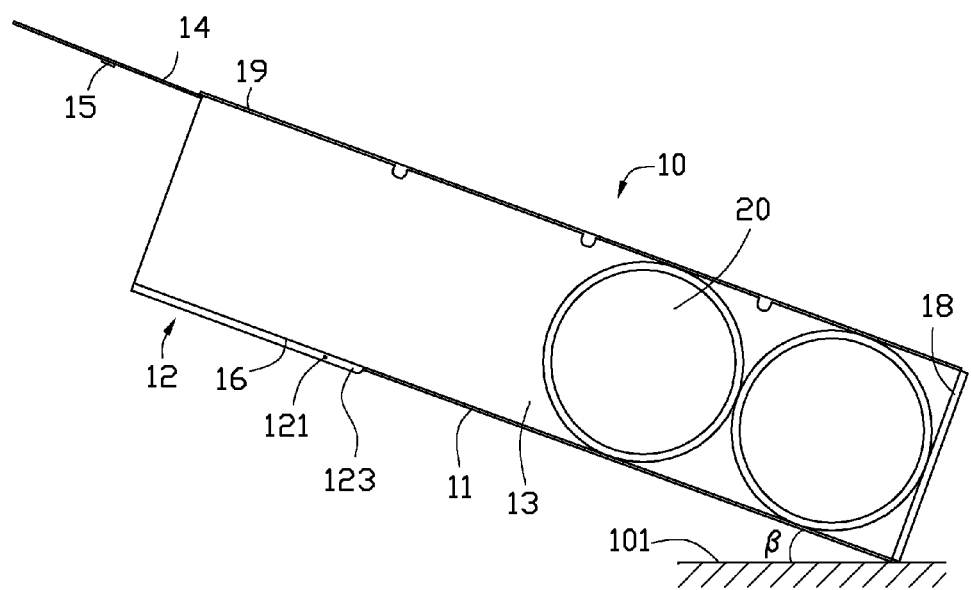
FIG. 4 is similar to FIG. 3, the shielding plate is closed, and the securing plate is open.
Figure 5:
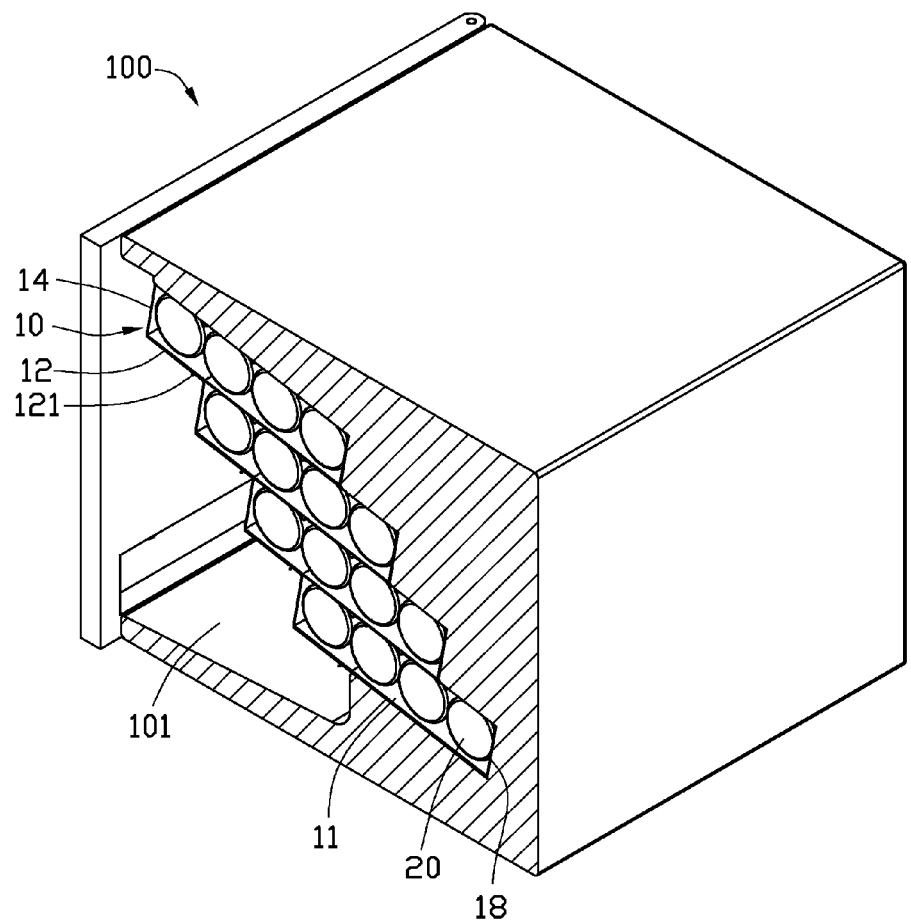
FIG. 5 is an isometric view of a vending mechanism with a plurality of product delivery devices in accordance with an embodiment.

FIGS. 1-5 illustrate an embodiment of a product delivery device. The product delivery device comprises a plurality of receiving trays 10. Each receiving tray 10 is used for receiving a plurality of products 20. In one embodiment, the product delivery device is placed in a cabinet 100 (see FIG. 4) of the automatic vending mechanism (not shown).

Each receiving tray 10 comprises a bottom plate 11, a shielding plate 12, two side plates 13 (only one is shown in FIGS. 1-4), a securing plate 14, a pushing plate 18, and a top plate 19. In one embodiment, the bottom plate 11 is substantially parallel to the top plate 19 and substantially perpendicular to the side plates 13. The bottom plate 11 defines a product exit 16. A size and shape of the product exit 16 is substantially equal to a size and shape of the shielding plate 12, so that the shielding plate 12 can fill in the product exit 16 and be coplanar with the bottom plate 11. Two pivoting posts 121 extend from opposite side edges of the shielding plate 12, respectively. A tab 131 defining a pivoting hole 132 extends from a bottom edge of each side plate 13. The two pivoting posts 121 are received in the two pivoting holes 1311 to rotatably secure the shielding plate 12 to the two side plates 13.

The pushing plate 18 is located between the bottom plate 11 and the top plate 19 and is connected to a pushing device (not shown), so that the pushing plate 18 is moveable by the pushing device along a first direction that is substantially parallel to the bottom plate 11.

The securing plate 14 is rotatably attached to the top plate 19 by a securing means, such as a hinge (not shown), so that the securing plate 14 is rotatable relative to the top plate 19. A sensor 15 is attached to a side surface of the securing plate 14 facing the plurality of products 20. The sensor 15 sends infrared signals to the pushing device to signal the pushing device to operate.

When the plurality of receiving trays 10 is received in the cabinet 100, the receiving trays 10 are arranged in a staircase shape, so that the shielding plate 12 of each receiving tray 10 is not covered by another receiving tray 10. Each receiving tray 10 is angled toward a bottom panel 101 of the cabinet 100, such that the shielding plates 12 of the receiving trays 10 are higher than the respective pushing plates 18 relative t to the bottom panel. Thus, the shielding plates 12 of the receiving trays 10 are not blocked by other receiving trays 10.

To place the products 20 into the receiving tray 10, the pushing device and the pushing plate are first in an original position at a rear end of the receiving tray 10. The securing plate 14 is rotated about a first axis that is substantially perpendicular to the side plates 13, so that an opening 17 is defined in the receiving tray 10. The products 20 are placed into the receiving tray 10, and the securing plate 14 is rotated back to cover the opening 17 once the receiving tray 10 is filled with the products 20.

In use, the shielding plate 12 is rotated by a controlling device (not shown) about a second axis that is substantially parallel to the first axis, until the shielding plate 12 is substantially perpendicular to the bottom plate 11. The product exit 16 is opened, and a first product 20 abutting the shielding plate 12 drops out of the receiving tray 10. The shielding plate 12 forms a preventing portion 123 adjacent to the pivoting post 121. The preventing portions 123 extend through the product exit 16 when the shielding plate 12 is perpendicular to the bottom plate 11 to prevent a second product 20 adjacent to the first product 20 from dropping out of the product exit 16.

After the first product 20 drops out of the receiving tray 10, the shielding plate 12 is rotated back by the controlling device to cover the product exit 16. The pushing plate 18 is pushed by the pushing device along the first direction towards the shielding plate 12, until the second product 20 abuts the sensor 15. When the second product 20 abuts the sensor 15, the sensor 15 sends a signal to the pushing device, and the pushing device stops pushing the pushing plate 18. Thus, the products 20 are pushed by the pushing plate 18 to be ready to drop out of the product exit 16.

When the last product 20 drops out of the receiving tray 10, the pushing device is extended as far as it can go and cannot push the pushing plate 18 any further. After the sensor 15 does not sense anymore products 20 abutting the sensor 15 for a predetermined period of time, the pushing device pulls the pushing plate 18 along a second direction that is opposite to the first direction, until the pushing plate 18 is located at the rear end of the receiving tray 10 for waiting for the products 20 entering into the receiving tray 10.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A product delivery device comprising:
a receiving tray comprising a bottom plate, a top plate and a securing plate, a pushing plate, and a shielding plate; an opening defined in the receiving tray, the pushing plate is located on the bottom plate, and the shielding plate is rotatably attached to the bottom plate; a product exit is defined in the bottom plate and is covered by the shielding plate;
wherein the securing plate cover the opening, and the securing plate is rotatable relative to the top plate for allowing the product to enter into the receiving tray via the opening; the pushing plate is moveable in a direction that is substantially parallel to the bottom plate for moving a product on the shielding plate, and the shielding plate is rotatable relative to the bottom plate for allowing the product out of the receiving tray via the product exit.

2. The product delivery device of claim 1, further comprising a cabinet, wherein the receiving tray is received in the cabinet, and the cabinet comprises a bottom panel; and the bottom plate is at an angle at the bottom panel.

3. The product delivery device of claim 1, wherein the receiving tray further comprises a side plate, a tab extends from the side plate, and the shielding plate is rotatably secured to the tab.

4. The product delivery device of claim 3, wherein the tab defines a pivoting hole, and the shielding plate comprises a pivoting post engaged in the pivoting hole.

5. The product delivery device of claim 1, wherein when the shielding plate covers the product exit, the shielding plate and the bottom plate are located on a same plane.

6. The product delivery device of claim 1, wherein the shielding plate comprises a preventing portion; and when the shielding plate is rotated to open the product exit, the preventing portion extends through the product exit for preventing products in the receiving tray out of the receiving tray.

7. The product delivery device of claim 1, further comprising a sensor attached to the securing plate; wherein the sensor is configured to send a signal to a pushing device, so that the pushing plate is moveable by the pushing device.

8. A product delivery device comprising:
a cabinet; and
a plurality of receiving trays received in the cabinet; each receiving tray comprising a bottom plate, a pushing plate, and a shielding plate; the pushing plate is located on the bottom plate, and the shielding plate is rotatably attached to the bottom plate; a preventing portion extending from the shielding plate and being coplanar with the shielding plate; a product exit is defined in the bottom plate and is covered by the shielding plate;
wherein the pushing plate is moveable in a direction that is substantially parallel to the bottom plate for moving a product on the shielding plate, and the shielding plate is rotatable relative to the bottom plate between a close position and an open position; in the close position, the shielding plate, the preventing portion, and the bottom plate are located on a same plane, and the product exit is covered by the shielding plate; in the open position, the shielding plate is substantially perpendicular to the bottom plate, the product exit is opened for allowing the product out of the receiving tray, and the preventing portion extends through the product exit for preventing products in the receiving tray out of the receiving tray.

9. The product delivery device of claim 8, wherein when the plurality of receiving trays are received in the cabinet, the plurality of receiving trays are arranged at in a staircase shape.

10. The product delivery device of claim 8, wherein the cabinet comprises a bottom panel; and
the bottom plate is at an angle at the bottom panel.

11. The product delivery device of claim 8, wherein the receiving tray further comprises a side plate, a tab extends from the side plate, and the shielding plate is rotatably secured to the tab.

12. The product delivery device of claim 11, wherein the tab defines a pivoting hole, and the shielding plate comprises a pivoting post engaged in the pivoting hole.

13. The product delivery device of claim 8, wherein an opening is defined in the receiving tray, the receiving tray further comprises a top plate and a securing plate covering the opening, and the securing plate is rotatable relative to the top plate for allowing the product to enter into the receiving tray via the opening.

14. The product delivery device of claim 13, further comprising a sensor attached to the securing plate; wherein the sensor is configured to send a signal to a pushing device, so that the pushing plate is moveable by the pushing device.

* * * * *